United States Patent
Reissig et al.

(10) Patent No.: US 10,870,491 B2
(45) Date of Patent: Dec. 22, 2020

(54) EDUCTOR DRIVEN ANTI-ICE SYSTEM

(71) Applicant: The Boeing Company, Chicago, IL (US)

(72) Inventors: Mark Anthony Reissig, Normandy Park, WA (US); David Jamal Lopes, Seattle, WA (US); Sho Sato, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 586 days.

(21) Appl. No.: 15/655,600

(22) Filed: Jul. 20, 2017

(65) Prior Publication Data

US 2019/0023405 A1    Jan. 24, 2019

(51) Int. Cl.
*B64D 15/04* (2006.01)
*B64D 33/02* (2006.01)

(52) U.S. Cl.
CPC ...... *B64D 15/04* (2013.01); *B64D 2033/0233* (2013.01)

(58) Field of Classification Search
CPC ............ B64D 2033/0233; B64D 15/04; B64D 15/00; B64D 13/08; B64D 15/22; B64D 2013/0618; B64D 15/02; B64D 15/16; B64D 29/00; B64D 2013/0607; B64D 13/02

See application file for complete search history.

(56) References Cited

U.S. PATENT DOCUMENTS

| | | | |
|---|---|---|---|
| 3,094,301 A * | 6/1963 | Taylor | B64D 15/02 244/134 R |
| 6,371,411 B1 | 4/2002 | Breer et al. | |
| 6,457,676 B1 | 10/2002 | Breer et al. | |
| 6,688,558 B2 * | 2/2004 | Breer | B64D 15/04 244/134 B |
| 9,242,735 B1 | 1/2016 | Meis et al. | |
| 9,429,680 B2 | 8/2016 | Grzych et al. | |
| 9,546,004 B1 | 1/2017 | Safai et al. | |
| 9,696,238 B2 | 7/2017 | Bosetti et al. | |
| 2015/0108233 A1 | 4/2015 | Wright | |
| 2015/0260099 A1 | 9/2015 | Gally et al. | |
| 2015/0291284 A1 * | 10/2015 | Victor | B64D 15/04 244/134 B |

(Continued)

FOREIGN PATENT DOCUMENTS

| | | | |
|---|---|---|---|
| CN | 105882979 | 8/2016 | |
| EP | 2862804 | 4/2015 | |
| EP | 2862804 A1 * | 4/2015 | B64D 15/12 |

OTHER PUBLICATIONS

EP2862804EnglishTranslation.*
Extended European Search Report dated Dec. 12, 2018 for European Patent Application No. 18175841.8.

*Primary Examiner* — Assres H Woldemaryam
(74) *Attorney, Agent, or Firm* — Gates & Cooper LLP

(57) ABSTRACT

An anti-ice system including means for removing water from a heated ice prone surface before the water reaches a surface downstream of the ice-prone surface. In one embodiment, the means comprises an eductor connected to the ice-prone surface. In another embodiment, the means comprises a mechanical pump connected to the ice-prone surface. Examples of the ice-prone surface include an engine inlet or an aero-surface on an aircraft.

20 Claims, 9 Drawing Sheets

(56) References Cited

U.S. PATENT DOCUMENTS

| | | |
|---|---|---|
| 2016/0311542 A1 | 10/2016 | Mackin |
| 2016/0332724 A1* | 11/2016 | Mehring ............... F28F 13/003 |
| 2017/0008635 A1 | 1/2017 | Mackin et al. |
| 2017/0057618 A1 | 3/2017 | Khozikov et al. |
| 2017/0127477 A1* | 5/2017 | Sandiford ............. B64D 41/00 |
| 2017/0158336 A1 | 6/2017 | Meis et al. |
| 2017/0166314 A1 | 6/2017 | Meis et al. |
| 2017/0190431 A1 | 7/2017 | Dichek et al. |
| 2018/0079511 A1* | 3/2018 | MacKin .................... F04F 5/24 |
| 2018/0079512 A1* | 3/2018 | Jackowski ............ B64D 15/08 |
| 2018/0194485 A1* | 7/2018 | Chilukuri ............... B64D 15/04 |
| 2018/0201387 A1* | 7/2018 | Porte ...................... F02C 7/045 |
| 2019/0233126 A1* | 8/2019 | Poloni ...................... B64C 3/00 |

* cited by examiner

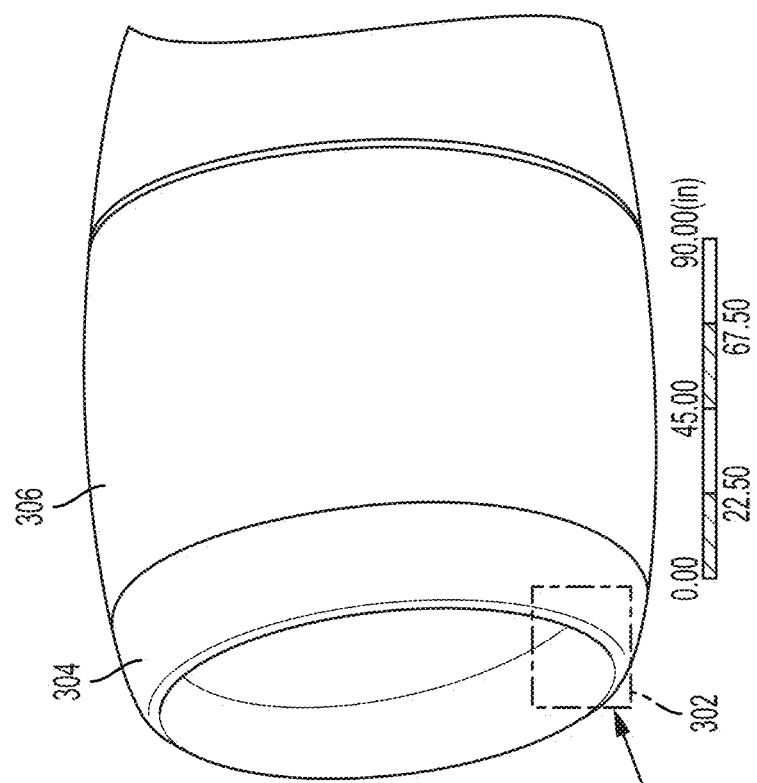
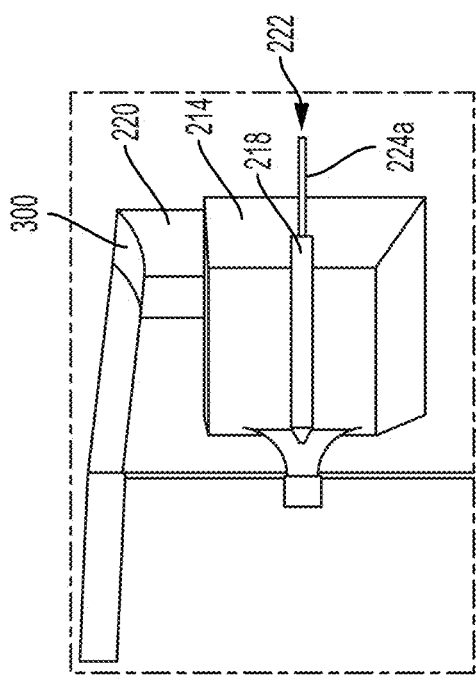
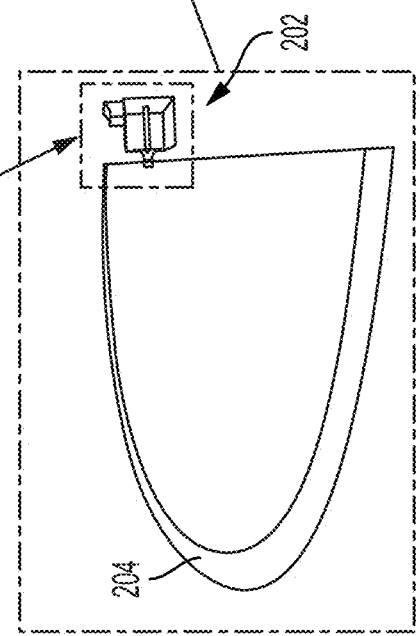
FIG. 3A
FIG. 3B
FIG. 3C

US 10,870,491 B2

EDUCTOR DRIVEN ANTI-ICE SYSTEM

BACKGROUND

1. Field

The present disclosure relates to anti-ice systems.

2. Description of the Related Art

Ice buildup on aerodynamic surfaces of aircraft can be problematic. For example, ice can build up on the leading edges of wings and/or engine nacelles, disrupting the intended airflow over the aerodynamic surfaces, causing a loss of lift generated by the aerodynamic surface. Or, in the case of an engine inlet, the ice reduces and distorts the airflow into the engine leading to potential engine stall. A combination of design considerations of modern airfoils and modern certification requirements results in less ice tolerance, meaning that modern aircraft need to have more anti-ice capability than some conventional anti-icing technologies can provide.

However, existing anti-ice technologies are complicated, expensive, and inefficient. Typical aircraft anti-icing systems depend on evaporating most of the icing droplets in an icing environment. This requires significant hot air bleed from the engine or heat from electrical power. Presently this anti-icing function is commonly achieved by using hot engine bleed air in a swirl system. FIG. 1 illustrates a conventional de-icing system 100 on an engine inlet 102, comprising an engine inlet swirl system 104 including a nozzle 106 transferring heat (in the form of engine bleed air 108) to the engine inlet's lip 110. While pressure of the engine bleed air 112 inputted into the lip 110 is varied, all the nozzles 106 are choked and the inlet air mass flow (of the engine bleed air 112 into the nozzle 106) is fixed by the design.

What is needed, then, is an anti-icing solution that is more energy efficient. The present disclosure satisfies this need.

SUMMARY

The present disclosure describes an anti-ice system, comprising a means (e.g., an eductor or mechanical pump) for removing water from a heated ice-prone surface before the water reaches a surface downstream of the heated ice-prone surface. A heating system coupled to the ice-prone surface heats the water so as to suppress freezing of the water on the ice-prone surface.

In various examples, the heated ice-prone surface is on a leading edge on at least one aircraft part selected from a wing, an engine inlet, and a tail.

In one or more embodiments, the eductor comprises a channel having an eductor suction inlet on the heated ice-prone surface, a water catch inlet covering the eductor suction inlet and allowing the water to pass through into the channel; and a primary eductor nozzle. Flow of pressurized air into the primary eductor nozzle creates a low pressure P beneath the water catch inlet that draws the water (e.g., runback) through the water catch inlet and into the channel.

Examples of the water catch inlet include, but are not limited to, a grid, a slot, and a porous material allowing the water comprising streams, droplets, or a film flows to pass into the channel through the eductor suction inlet.

The channel further comprises an outlet to an interior of the aircraft part, so that the water flows from the eductor suction inlet, through the channel, and into the interior when the pressurized air flows into the eductor nozzle. Water in the interior exits the aircraft part through a drain.

In one or more examples, the pressurized air comprises hot air that exhausts through the outlet of the channel and heats the interior so as to suppress freezing of the water in the interior.

BRIEF DESCRIPTION OF THE DRAWINGS

Referring now to the drawings in which like reference numbers represent corresponding parts throughout:

FIGS. 3A-3C illustrate positioning of an exemplary model ejector/eductor driven anti-ice system on an engine inlet, wherein FIG. 3A illustrates the anti-ice system, FIG. 3B is a cross-sectional view of the anti-ice system attached to engine inlet lip, and FIG. 3C is a three-dimensional view showing the positioning of the anti-ice system on the engine.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

Figure 1:
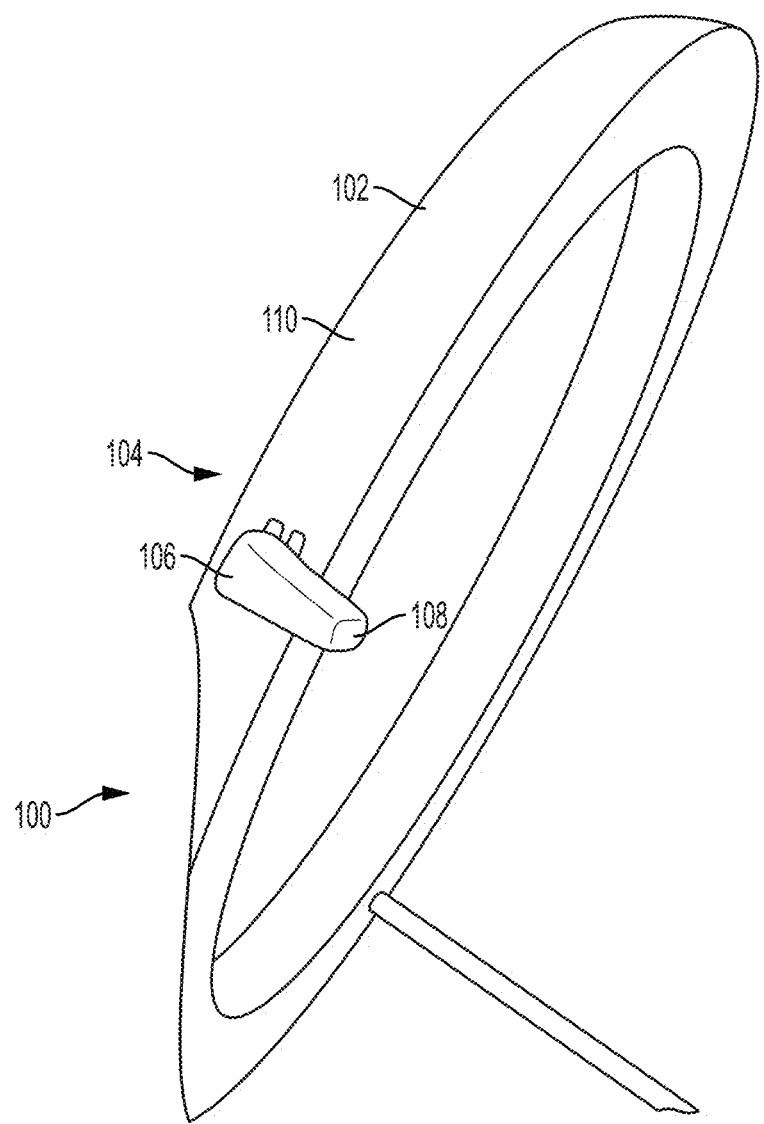
FIG. 1 illustrates an engine inlet comprising an engine inlet swirl system.
Figure 2:
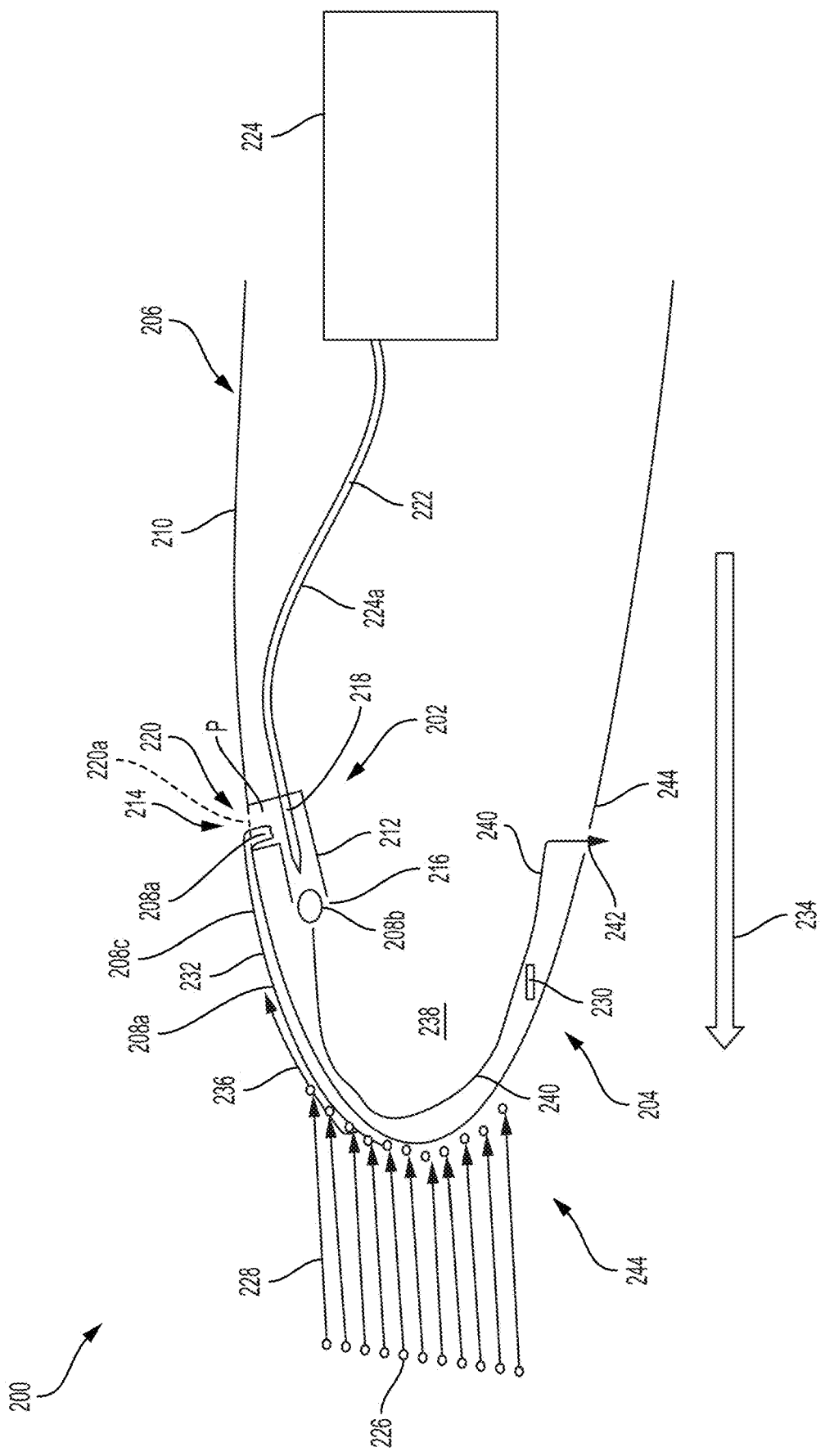
FIG. 2 illustrates an embodiment of an ejector or eductor driven anti-ice system on an aerodynamic surface.

FIG. 2 illustrates an anti-ice system (200) comprising an eductor or ejector (202) connected to a heated ice-prone surface (204) of an aero-surface (206), wherein the eductor (202) suctions water (208a) off the heated ice-prone surface (204) so as to remove the water (208a) before the water (208a) reaches a surface (210) on the aero-surface (206) that is downstream of the heated ice-prone surface (204). As used herein, an eductor is synonymous with an ejector.

The eductor (202) comprises a channel (212) having a eductor suction inlet (214) in the heated ice-prone surface (204), and an outlet (216). A primary eductor nozzle (218) connects to the channel (212) and a water catch inlet (220) (e.g., a grid (220a), a porous material, or a permeable material) covers the eductor suction inlet (214) and allows the water (208a) to pass through into the channel (212).

Flow of pressurized air (222) into the primary eductor nozzle (218) and then the channel (212) creates a low pressure region P (e.g., vacuum) in the channel (212) that draws the water (208a) through the water catch inlet (220) and the eductor suction inlet (214) and then into the channel (212). In one embodiment, the pressurized air (222) comprises hot and high pressure air outputted from an engine bleed air system (224) and directed to the eductor nozzle (218) through ducting (224a).

The water (208a) is formed from super-cooled water droplets (226) in the atmosphere that impinge (228) on the ice-prone surface (204). The anti-ice system (200) further comprises a heating system (230) thermally coupled (e.g., embedded in, or otherwise attached) to the ice-prone surface (204). Heating the ice-prone surface (204) using the heating system (230) prevents or suppresses freezing of the water droplets (226) so that the water droplets (226) form a runback film (232) on the ice-prone surface (204). Air flow over the aero-surface (206), due to movement of the aero-surface (206) through the atmosphere in the direction (234), also pushes the water (208a) towards the water catch inlet (220) so that the water (208a) flows (236) into the eductor suction inlet (214).

The low-pressure P suctions the water (208b) from the eductor suction inlet (214), through the channel (212), and then through the outlet (216) into an interior plenum (238) connected to the outlet (216). The pressurized air (222) also exhausts through the outlet (216) (forming a mixed exhaust comprising water (208b) and air (222)). When the pressurized air (222) comprises hot air, the water (208b) in the interior plenum (238) and/or the interior plenum (238) are heated by the pressurized air (222) so as to suppress freezing of the water (208b) in the interior plenum (238). After the exhaust, the water (208b) then flows (240) overboard through an exit drain (242).

FIG. 3A illustrates an embodiment wherein the eductor suction inlet (214) comprises a water catch inlet (300) allowing the water (208a) to pass through into the channel (212). The water catch inlet (300) has a circumferential area and a minimal length in the flow direction (236). In one or more embodiments, a plurality of eductors (202) are connected to the ice-prone surface (204) on the aero-surface (206) and the surface area of each slot (300) is optimized depending on the number and distribution of the eductors (202).

FIGS. 3B and 3C illustrate positioning (302) of the eductor (202) on the aero-surface (206) of an engine inlet (304) on an aircraft engine (306).

Figure 3D:
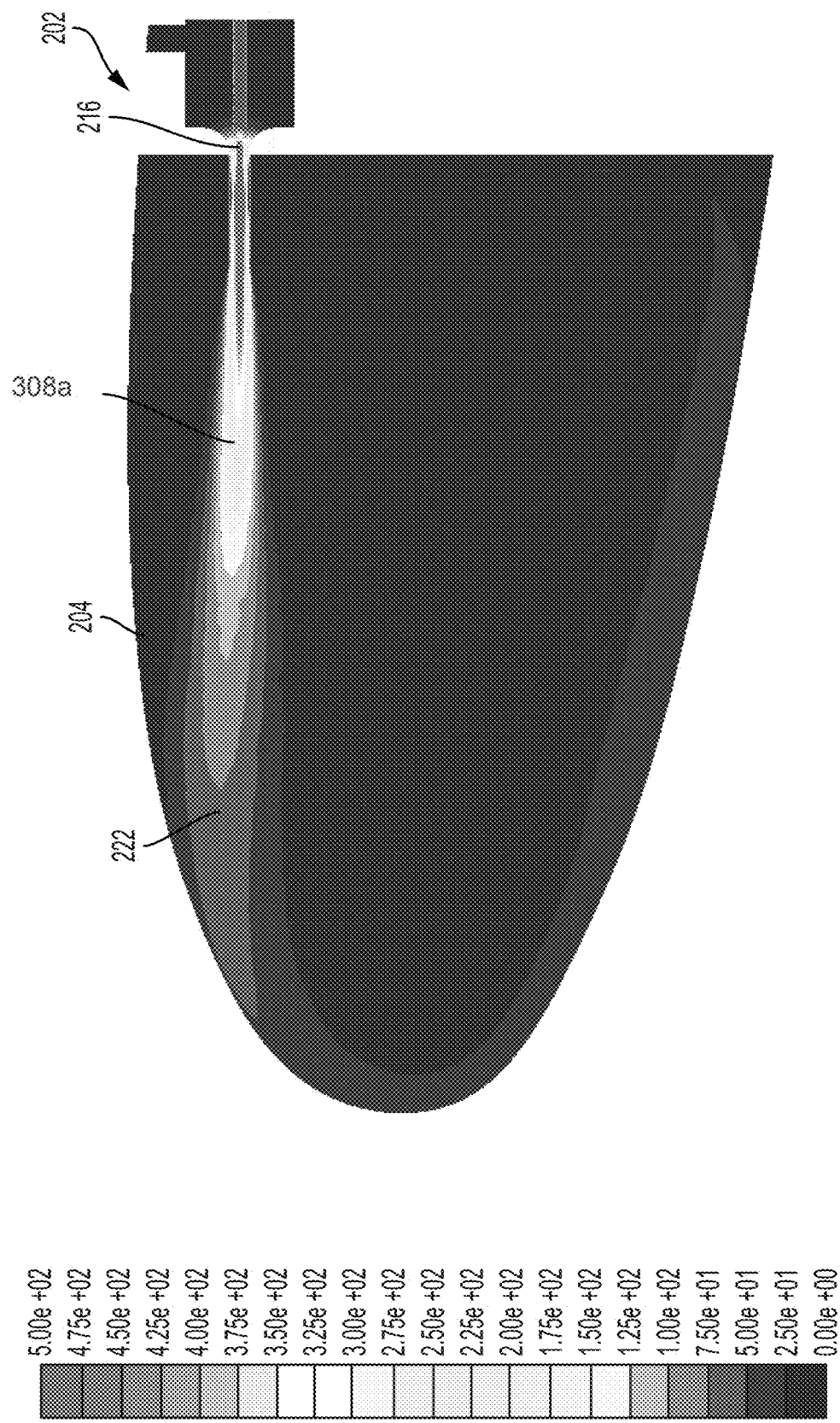
FIG. 3D is a velocity contour plot of the engine bleed air flow outputted from the eductor system into the interior plenum for the model illustrated in FIGS. 3A-3C.

FIG. 3D is a velocity contour plot of the pressurized air (222) comprising hot air (308a) (engine bleed air flow (308b)) outputted from the outlet (216) into the interior plenum (238), for the model eductor system (202) illustrated in FIG. 3A.

Figure 4:
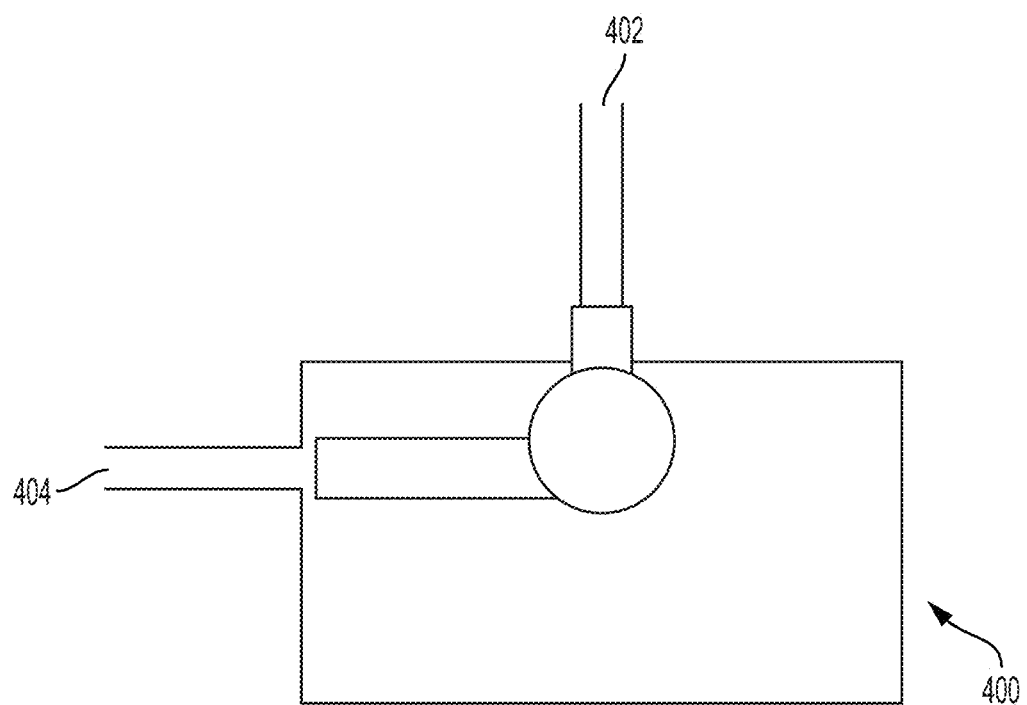
FIG. 4 is a schematic of an exemplary mechanical pump used in an anti-ice system.

FIG. 4 illustrates a mechanical pump (400) used to suction or pump water in place of the eductor (202) from the heated-ice prone surface (204). The pump (400) comprises an input (402) in place of the eductor suction inlet (214) and an output (404) in place of the eductor outlet (216).

Figure 5:
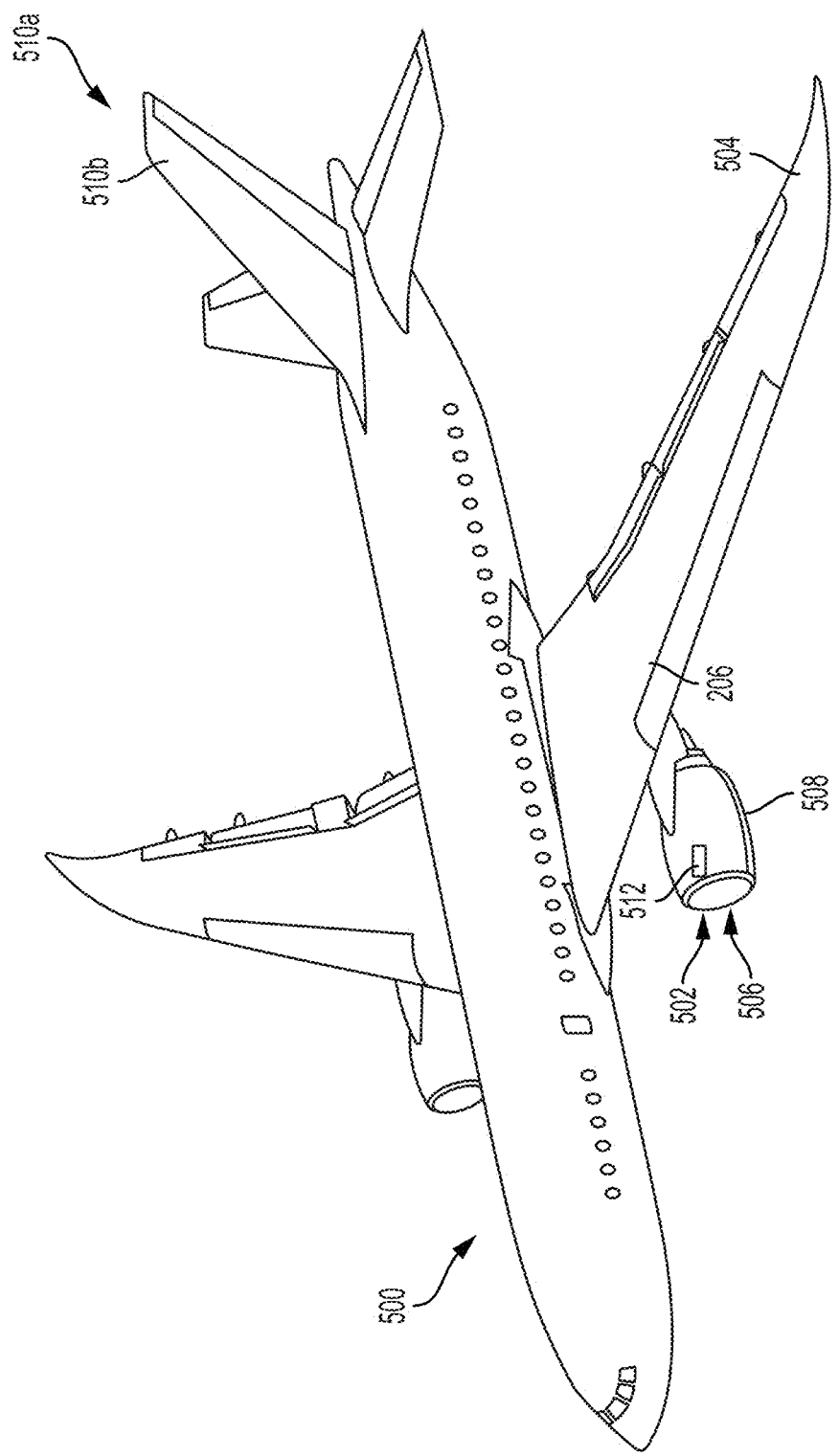
FIG. 5 is a schematic of an aircraft including an anti-ice system.

FIG. 5 illustrates an aircraft (500) comprising a plurality of aerodynamic surfaces (206), wherein one or more of the aerodynamic surfaces (206) include a heated ice-prone surface (204). The one or more heated ice-prone surfaces (204) are on at least one aircraft part (502) selected from a wing (504), an engine inlet (506) of a nacelle (508), and empennage (510a), e.g., tail (510b). Also shown is the means (512) for suctioning or removing water (208a) connected to the heated-ice prone surface (204).

Process Steps
Fabrication

Figure 6:
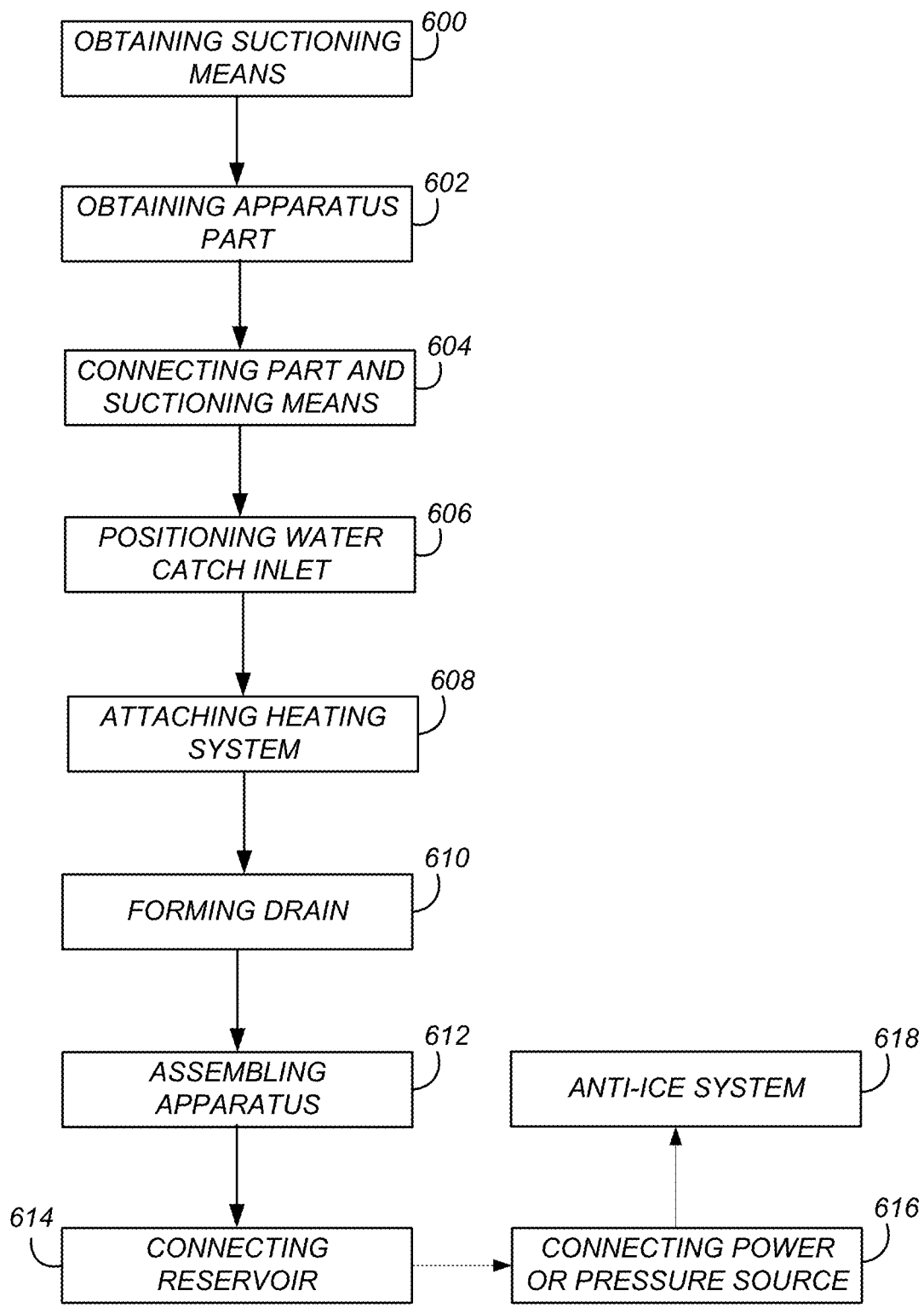
FIG. 6 is a flowchart illustrating a method of fabricating an anti-ice system according to one or more embodiments.

FIG. 6 is a flowchart illustrating a method of fabricating an anti-ice system (200) on an apparatus or vehicle such as, but not limited to, an aircraft (500).

Block 600 represents obtaining or fabricating means (512) for removing or suctioning water (208a). In one embodiment, the means (512) comprises a mechanical pump (400). In another embodiment, the means (512) comprises an eductor (202) comprising a channel (212) having a eductor suction inlet (214) and an outlet (216), and wherein an eductor nozzle (218) connected to the channel (212). The channel (212) and nozzle (218) are typically fabricated from metal such as, but not limited to, titanium, aluminum, and alloys thereof.

Block 602 represents fabricating or obtaining a vehicle part, an aircraft part (502), or apparatus part forming an ice-prone surface (204). The step comprises forming an opening in the part (e.g., in a panel of the part (502) comprising an aircraft engine inlet (304), (506), an aircraft wing (504), and/or an aircraft tail (510)).

Block 604 represents connecting the opening to the input (402) of the mechanical pump (400) or to the eductor suction inlet (214) of the eductor (202). In one or more embodiments, the eductor suction inlet (214) or the input (402) to the pump (400) are positioned in the ice-prone surface (204) so as to suction the water (208a) comprising runback (232) on a leading edge (244) of the ice-prone surface (204).

Block 606 represents positioning a water catch inlet (220) (e.g., a grid (220a), a porous material, or a permeable material) so as to cover the eductor suction inlet (214) or the input (402) to the mechanical pump (400), wherein the water catch inlet (220) allows water (208a) to pass through into the channel (212) or the mechanical pump (400).

Block 608 represents attaching a heating system (230) on the part (502). The heating system (230) melts ice (208c) or prevents freezing of the water (208a) on the ice-prone surface (204).

Block 610 represents forming a drain (242) on an underside (244) the part (502).

Block 612 represents optionally assembling the part (502) (with the means (512) for removing or suctioning water) into a completed vehicle, aircraft (500), or apparatus.

Block 614 represents connecting an output (404) from the mechanical pump (400), or the outlet (216) from eductor (202), to an interior plenum (238) inside the part (502), or to a reservoir connected to the part (502).

Block 616 represents connecting the mechanical pump (400) to a power source, or connecting the eductor nozzle (218) to a pressurized air source such as an engine air bleed system (224).

Block 618 represents the end result, an anti-ice system (200) attached to a vehicle, aircraft (500), or apparatus, the anti-ice system comprising means (512) (e.g., an eductor (202) or mechanical pump(400) or statutory equivalents thereof) for removing water (208a) off the ice prone surface (204), so as to remove the water (208a) before the water (208a) reaches a surface (210) downstream of the heated ice-prone surface (204). In one or more embodiments, a plurality of eductors (202) or pumps (400) are connected to the ice-prone surface (204) on the aero-surface (206).

Operation

Figure 7:
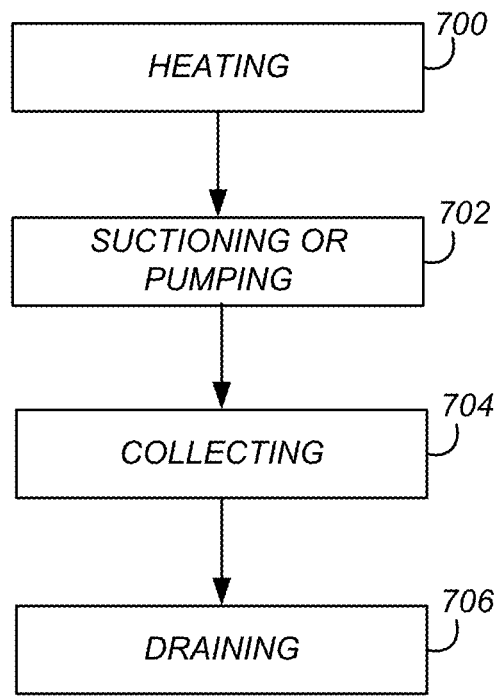
FIG. 7 is a flowchart illustrating a method of removing water from an aerodynamic surface according to one or more embodiments.

FIG. 7 illustrates a method of removing water (208a) from an ice-prone surface (204) of a vehicle, aircraft (500) or apparatus. The method comprises the following steps.

Block 700 represents heating the ice-prone surface (204), so as to suppress the freezing of the water (208a) or melt ice (208c) into water (208a) on the ice-prone surface (204). In one or embodiments, the water (208a) comprises streams, droplets, or a film (232).

Block 702 represents suctioning, vacuuming, or pumping water (208a) from the heated ice-prone surface (204). In one embodiment, the suctioning uses an eductor (202) and the method comprises flowing pressurized air (222) through the eductor (202) so as to form a low pressure region (P) (e.g., a vacuum) in the eductor (202) that suctions the water (208a) into the eductor (202). In another embodiment, the pumping uses a mechanical pump (400).

Block 704 represents collecting the water (208a) suctioned by the eductor (202), or pumped by the pump (400), in a reservoir attached to the part (502). In one or more embodiments, the part (502) has an interior plenum (238) and the eductors (202) each comprise a channel (212) directing the water (208b) to the interior plenum (238). In another embodiment, the output (404) of the mechanical pump (400) is connected to the interior plenum (238) and directs the water (208b) to the interior plenum (238).

Block 706 represents draining the water (208b) from the interior (238) through a drain (242) on an underside (244) of the part (502).

In one or more embodiments, the system (200) only needs to provide sufficient power to keep the droplets (226) from freezing, and therefore the total power drawn is less (e.g., 10% less) than is used in conventional anti-icing systems. The power advantage coupled with the improved anti-icing performance provided by the eductor driven anti-icing system (according to one or more examples) translates into less fuel consumption and therefore greater fuel efficiency for the aircraft (500) during flight.

Processing Environment

Figure 8:
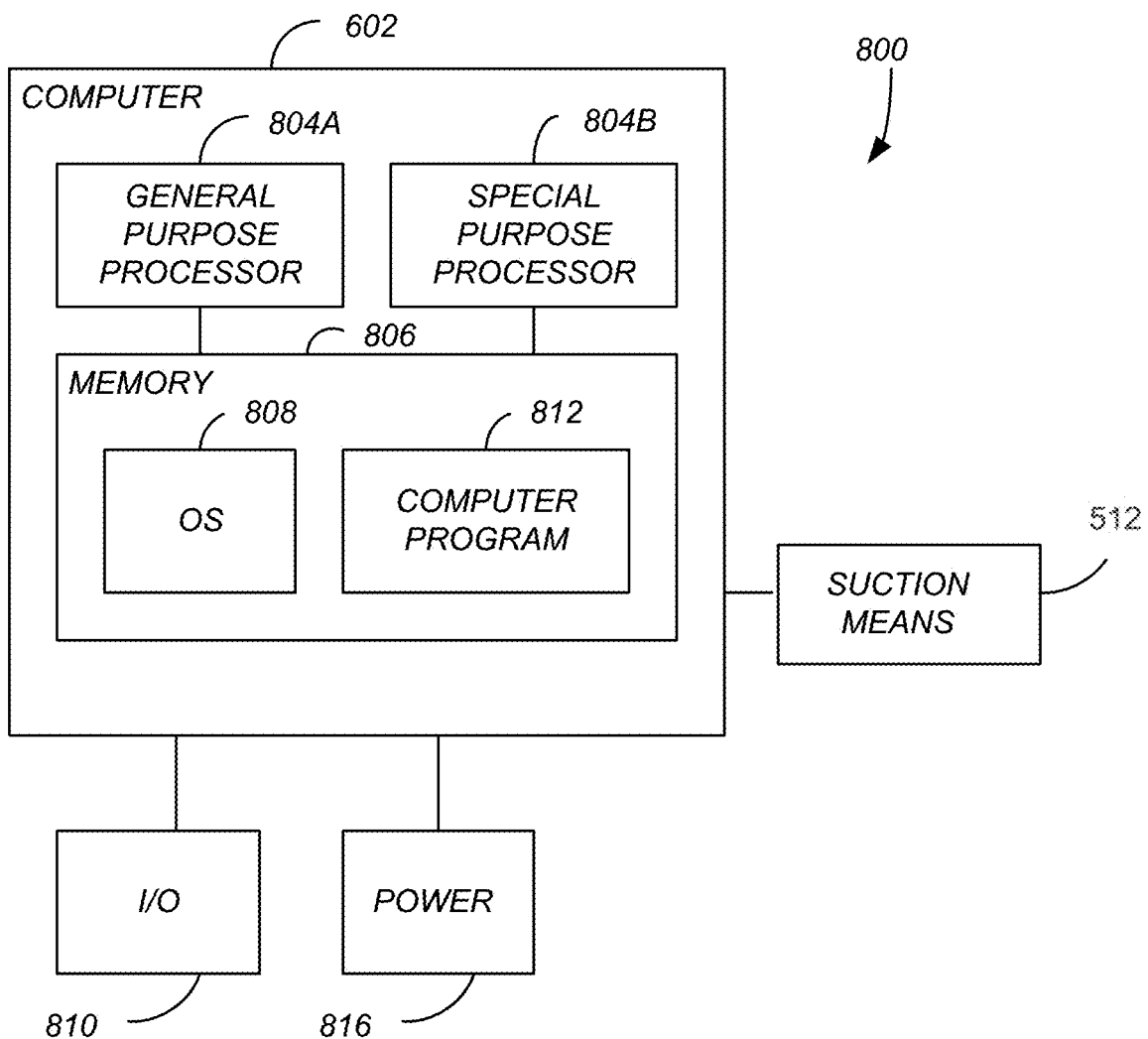
FIG. 8 illustrates a hardware environment for controlling the anti-ice system according to one or more embodiments.

FIG. 8 illustrates an exemplary system 800 that could be used to implement processing elements needed to control (e.g., activate, de-activate, or otherwise control) the suctioning means (512) described herein. The computer system is typically located on the aircraft e.g., but not limited to, in a box mounted on the engine fan case or inside the aircraft.

The computer 802 comprises a processor 804 (general purpose processor 804A and special purpose processor 804B) and a memory, such as random access memory (RAM) 806. Generally, the computer 802 operates under control of an operating system 808 stored in the memory 806, and interfaces with the user/other computers to accept inputs and commands (e.g., analog or digital signals) and to present results through an input/output (I/O) module 810. The computer program application 812 accesses and manipulates data stored in the memory 806 of the computer 802. The operating system 808 and the computer program 812 are comprised of instructions which, when read and executed by the computer 802, cause the computer 802 to perform the operations herein described. In one embodiment, instructions implementing the operating system 808 and the computer program 810 are tangibly embodied in the memory 806, thereby making a computer program product or article of manufacture. As such, the terms "article of manufacture," "program storage device" and "computer program product" as used herein are intended to encompass a computer program accessible from any computer readable device or media.

In one embodiment, computer 802 comprises one or more field programmable gate arrays (FPGAs). In one embodiment, an Electronic Engine Control (EEC) sends a digital request to the computer 802 through I/O 810 to activate, de-activate, or otherwise control the suctioning means (512). FIG. 8 further illustrates a power source 816 for providing power to the system 800.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
an anti-ice system, comprising:
an eductor including:
a channel including an inlet and an outlet; and
a nozzle connected to the channel; and
at least one aircraft part including an ice-prone surface, the ice-prone surface including the inlet, wherein a flow of pressurized air into the channel from the nozzle suctions water off the ice-prone surface through the inlet and into the outlet, so as to remove the water before the water freezes downstream of the ice-prone surface.

2. The apparatus system of claim 1, wherein the ice-prone surface is an aerodynamic surface on the at least one the aircraft part selected from a wing, an engine inlet, and a tail.

3. The apparatus of claim 2, further comprising:
a covering on the inlet allowing the water to pass through into the channel, wherein the flow of pressurized air into the nozzle creates a low pressure P beneath the covering that draws the water through the covering and into the channel.

4. The apparatus of claim 3, wherein the covering comprises at least one member selected from a grid, a slot, and a porous material allowing the water comprising at least one member selected from a stream, a droplet, and a film flow, to pass through the covering.

5. The apparatus system of claim 2, wherein:
the pressurized air comprises engine bleed air.

6. The apparatus of claim 5, wherein the inlet is positioned on the ice-prone surface so as to suction the water comprising runback on a leading edge of the ice-prone surface.

7. The apparatus of claim 5, wherein:
the at least one aircraft part has an interior plenum;
the outlet outputs to the interior plenum; and
the water flows from the inlet, through the channel, and into the interior plenum when the pressurized air flows into the nozzle.

8. The apparatus of claim 7, further comprising a drain on an underside of the at least one aircraft part, wherein the water in the interior plenum exits the aircraft part through the drain.

9. The apparatus of claim 7, wherein the pressurized air comprises hot air that exhausts through the outlet and heats the interior plenum so as to suppress freezing of the water in the interior plenum.

10. The apparatus of claim 1, further comprising a heating system on the ice-prone surface, wherein the heating system heats the water so as to melt ice or suppress freezing of the water on the ice-prone surface.

11. A method of removing water from an ice-prone surface, comprising:
suctioning water from an ice-prone surface using an eductor, comprising a nozzle and a channel connected to the nozzle, wherein the channel includes an outlet and an inlet in the ice-prone surface; and providing a flow of pressurized air through the nozzle and into the channel, wherein the flow of pressurized air creates a low pressure P in the inlet that draws the water through the inlet so as to remove the water from the ice-prone surface.

12. The method of claim 11, further comprising heating the ice-prone surface, so as to melt ice or suppress a freezing of the water on the ice-prone surface.

13. The method of claim 11, wherein the ice-prone surface is an aerodynamic surface on at least one aircraft part selected from a wing, an engine inlet, and a tail.

14. The method of claim 13, further comprising collecting the water suctioned by the eductor in an interior plenum of the at least one aircraft part.

15. The method of claim 14, further comprising draining the water from the interior plenum through a drain on an underside of the aircraft part.

16. An anti-ice system, comprising:
an engine inlet comprising a lip and an opening; and
an anti-ice system comprising:
 a mechanical pump, or
 at least one eductor including:
  a channel including an outlet and the opening comprising an inlet; and
  a nozzle connected to the channel, wherein a flow of pressurized air into the nozzle creates a low pressure P that draws water into the channel through the inlet; and
 a covering on the opening allowing the water to pass through into the channel or the mechanical pump, the covering comprising a grid, a slot, or a porous material; and wherein
the anti-ice system removes the water from the lip before the water reaches a surface downstream of the engine inlet.

17. The system of claim 16, wherein the anti-ice system comprises the at least one eductor connected to the lip and an engine bleed air system, wherein the at least one eductor suctions the water using the low pressure created by the pressurized air comprising engine bleed air ducted from the engine bleed air system.

18. The system of claim 16, wherein the anti-ice system comprises the mechanical pump connected to the lip.

19. The system of claim 16, wherein the at least one eductor comprises a plurality of eductors connected to the lip and an engine bleed air system, wherein the plurality of eductors suction the water using the low pressure created by the pressurized air comprising engine bleed air ducted from the engine bleed air system.

20. The system of claim 1, wherein the aircraft part comprises an engine inlet.

* * * * *